(12) United States Patent
Lin et al.

(10) Patent No.: US 10,368,067 B2
(45) Date of Patent: Jul. 30, 2019

(54) METHOD AND APPARATUS FOR SELECTIVE FILTERING OF CUBIC-FACE FRAMES

(71) Applicant: MEDIATEK INC., Hsin-Chu (TW)

(72) Inventors: Hung-Chih Lin, Caotun Township, Nantou County (TW); Jian-Liang Lin, Su'ao Township, Yilan County (TW); Chia-Ying Li, Taipei (TW); Chao-Chih Huang, Zhubei (TW); Shen-Kai Chang, Zhubei (TW)

(73) Assignee: MEDIATEK INC., Hsin-Chu (TW)

( * ) Notice: Subject to any disclaimer, the term of this patent is extended or adjusted under 35 U.S.C. 154(b) by 44 days.

(21) Appl. No.: 15/618,216

(22) Filed: Jun. 9, 2017

(65) Prior Publication Data

US 2017/0366808 A1    Dec. 21, 2017

Related U.S. Application Data

(60) Provisional application No. 62/350,214, filed on Jun. 15, 2016.

(51) Int. Cl.
| | |
|---|---|
| *H04N 19/00* | (2014.01) |
| *H04N 19/117* | (2014.01) |
| *H04N 19/167* | (2014.01) |
| *H04N 19/172* | (2014.01) |
| *H04N 19/196* | (2014.01) |
| *H04N 19/463* | (2014.01) |
| *H04N 19/70* | (2014.01) |
| *H04N 19/82* | (2014.01) |

(Continued)

(52) U.S. Cl.
CPC ......... *H04N 19/117* (2014.11); *H04N 5/2258* (2013.01); *H04N 5/23238* (2013.01); *H04N 19/167* (2014.11); *H04N 19/172* (2014.11); *H04N 19/196* (2014.11); *H04N 19/46* (2014.11); *H04N 19/463* (2014.11); *H04N 19/597* (2014.11); *H04N 19/70* (2014.11); *H04N 19/82* (2014.11); *H04N 5/2252* (2013.01)

(58) Field of Classification Search
CPC .... H04N 5/232; H04N 13/02; H04N 5/23238; G06T 11/60; G06T 17/00; G06T 15/00; G06T 2210/56
See application file for complete search history.

(56) References Cited

U.S. PATENT DOCUMENTS

| | | | | |
|---|---|---|---|---|
| 5,124,915 A | * | 6/1992 | Krenzel | ................. G01C 11/00 702/5 |
| 7,391,450 B2 | * | 6/2008 | Pinto | ...................... G06T 5/006 348/251 |

(Continued)

FOREIGN PATENT DOCUMENTS

CN          102685532 A        9/2012

*Primary Examiner* — Frank F Huang
(74) *Attorney, Agent, or Firm* — McClure, Qualey & Rodack, LLP

(57) ABSTRACT

Methods and apparatus of processing cube face images are disclosed. According to embodiments of the present invention, one or more discontinuous boundaries within each assembled cubic frame are determined and used for selective filtering, where the filtering process is skipped at said one or more discontinuous boundaries within each assembled cubic frame when the filtering process is enabled. Furthermore, the filtering process is applied to one or more continuous areas in each assembled cubic frame.

11 Claims, 10 Drawing Sheets

(51) Int. Cl.
   *H04N 5/232*     (2006.01)
   *H04N 19/597*    (2014.01)
   *H04N 19/46*     (2014.01)
   *H04N 5/225*     (2006.01)

(56) References Cited

U.S. PATENT DOCUMENTS

| | | | | |
|---|---|---|---|---|
| 7,408,576 | B2* | 8/2008 | Pinto | H04N 5/217 348/251 |
| 7,834,921 | B1* | 11/2010 | Pinto | G06T 5/006 348/251 |
| 8,296,656 | B2* | 10/2012 | Dowdy | G06F 17/30775 715/727 |
| 9,685,088 | B2* | 6/2017 | Trent | G08G 5/0034 |
| 9,984,494 | B2* | 5/2018 | Pylvaenaeinen | G06T 3/4038 |
| 9,992,502 | B2* | 6/2018 | Abbas | H04N 19/146 |
| 10,063,792 | B1* | 8/2018 | Brailovskiy | H04N 5/2628 |
| 2006/0055710 | A1* | 3/2006 | Lo | G09G 5/14 345/629 |
| 2008/0247602 | A1* | 10/2008 | Fields | G06K 9/209 382/106 |
| 2009/0143967 | A1* | 6/2009 | Lee | B60R 1/00 701/119 |
| 2009/0177989 | A1* | 7/2009 | Ma | G06F 3/0482 715/766 |
| 2010/0145495 | A1* | 6/2010 | Terai | D04B 37/02 700/141 |
| 2010/0165104 | A1* | 7/2010 | Fujita | B60R 1/00 348/148 |
| 2010/0306657 | A1* | 12/2010 | Derbyshire | G06F 17/30749 715/727 |
| 2011/0069084 | A1* | 3/2011 | Brown | G02B 26/0816 345/606 |
| 2011/0193814 | A1* | 8/2011 | Gay | G02B 27/2221 345/173 |
| 2011/0249153 | A1* | 10/2011 | Hirooka | B60R 1/00 348/241 |
| 2014/0218354 | A1 | 8/2014 | Park et al. | |
| 2015/0117784 | A1* | 4/2015 | Lin | G06K 9/4671 382/195 |
| 2015/0341552 | A1* | 11/2015 | Chen | H04N 5/23238 348/38 |
| 2016/0057380 | A1* | 2/2016 | Liu | H04N 5/913 386/254 |
| 2016/0088287 | A1* | 3/2016 | Sadi | H04N 13/254 348/43 |
| 2016/0210445 | A1* | 7/2016 | Deaver | G06F 21/12 |

* cited by examiner

METHOD AND APPARATUS FOR SELECTIVE FILTERING OF CUBIC-FACE FRAMES

CROSS REFERENCE TO RELATED APPLICATIONS

The present invention claims priority to U.S. Provisional Patent Application Ser. No. 62/350,214, filed on Jun. 15, 2016. The U.S. Provisional Patent Application is hereby incorporated by reference in its entirety.

FIELD OF THE INVENTION

The present invention relates to image and video coding. In particular, the present invention relates to techniques of selective filtering for cubic-face frames converted from 360-degree panorama video.

BACKGROUND AND RELATED ART

The 360-degree video, also known as immersive video is an emerging technology, which can provide "feeling as sensation of present". The sense of immersion is achieved by surrounding a user with wrap-around scene covering a panoramic view, in particular, 360-degree field of view. The "feeling as sensation of present" can be further improved by stereographic rendering. Accordingly, the panoramic video is being widely used in Virtual Reality (VR) applications.

Immersive video involves the capturing a scene using multiple cameras to cover a panoramic view, such as 360-degree field of view. The immersive camera usually uses a set of cameras, arranged to capture 360-degree field of view. Typically, two or more cameras are used for the immersive camera. All videos must be taken simultaneously and separate fragments (also called separate perspectives) of the scene are recorded. Furthermore, the set of cameras are often arranged to capture views horizontally, while other arrangements of the cameras are possible.

FIG. 1 illustrates an exemplary processing chain for 360-degree spherical panoramic pictures. The 360-degree spherical panoramic pictures may be captured using a 360-degree spherical panoramic camera, such as a 3D capture device. Spherical image processing unit 110 accepts the raw image data from the 3D capture device to form 360-degree spherical panoramic pictures. The spherical image processing may include image stitching and camera calibration. The spherical image processing is known in the field and the details are omitted in this disclosure. An example of a 360-degree spherical panoramic picture from the spherical image processing unit 110 is shown as picture 112 in FIG. 1. The top side of the 360-degree spherical panoramic picture corresponds to the vertical top (or sky) and the bottom side points to ground if the camera is oriented so that the top points up. However, if the camera is equipped with a gyro, the vertical top side can always be determined regardless how the camera is oriented. In the 360-degree spherical panoramic format, the contents in the scene appear to be distorted. Often, the spherical format is projected to the surfaces of a cube as an alternative 360-degree format. The conversion can be performed by a projection conversion unit 120 to derive the six face images 122 corresponding to the six faces of a cube. On the faces of the cube, these six images are connected at the edges of the cube.

In order to preserve the continuity of neighboring cubic faces sharing a common cubic edge, various cubic face assembly techniques have been disclosed in an related U.S. Non-provisional patent application Ser. No. 15/390,954, files on Dec. 27, 2016, with some common inventors and the same assignee. The assembled cubic-face frames may help to improve coding efficiency. Accordingly, cubic face assembler 130 is used to assemble the six cubic faces into an assembled cubic-face frame. The assembled image sequence is then subject to further processing. The cubic face assembler 130 may generate fully connected cubic-face frames or partially connected cubic-face frames. Since the 360-degree image sequences may require large storage space or require high bandwidth for transmission, video encoding by a video encoder 140 may be applied to the video sequence consisting of a sequence of assembled cubic-face frames. At a receiver side or display side, the compressed video data is decoded using a video decoder 150 to recover the sequence of assembled cubic-face frames for display on a display device (e.g. a 3D display). Information related to the assembled cubic-face frames may be provided to the video encoder 140 for encoding efficiently and/or properly and rendering appropriately.

FIG. 2 illustrates an example of the project conversion process to project a spherical panoramic picture into six cubic faces on a cube 210. The six cubic faces are separated into two groups. The first group 220 corresponds to the three cubic faces, labelled as 3, 4 and 5, that are visible from the front side. The second group 230 corresponds to the three cubic faces, labelled as 1, 2 and 6, that are visible from the back side of the cube.

In conventional video coding or processing, the coding or processing system always assumes the input video sequence. Therefore, the cubic faces are further assembled into cubic-face frames. FIG. 3A illustrates two examples cubic-face assembled frames (310 and 320) with blank areas, where two sets of fully interconnected cubic faces correspond to two different way of unfolding the six faces from the cube. The unfolded cubic faces (also called a cubic net) are fitted into a smallest rectangular frame with blank areas filled with dummy data.

FIG. 3B illustrates examples of another type of cubic-face assembling, where the six faces are assembled into a rectangular frame without blank area. In FIG. 3B, frame 330 corresponds to a 1×6 assembled cubic frame, frame 340 corresponds to a 2×3 assembled cubic frame, frame 350 corresponds to a 3×2 assembled cubic frame and frame 360 corresponds to a 6×1 assembled cubic frame. As shown in FIG. 3B, the six cubic faces are compactly fitted into a rectangle without any blank area.

FIG. 4A illustrates an exemplary block diagram of a video encoder system, such as HEVC (High Efficiency Video Coding), incorporating adaptive Inter/Intra prediction. The system includes two prediction modes: Inter prediction 420 and Intra prediction 430. The Inter Prediction 420 utilizes motion estimation (ME) and motion compensation (MC) to generate temporal prediction for a current frame 410 based on previous reconstructed picture or pictures. The previous reconstructed pictures, also referred as reference pictures, are stored in the Frame Buffer 480. As is known in the field, the ME for the Inter prediction uses translational motion model, where the motion can be specified by an associated motion vector. The Intra prediction 430 generates a predictor for a current block by using reconstructed pixels at neighboring blocks in the same slice or picture. A switch 445 is used to select among Inter prediction 420 and the Intra prediction 430. The selected prediction is subtracted from the corresponding signal of the current frame to generate prediction residuals using an Adder 440. The prediction residuals are processed using DCT (Discrete Cosine Transform) and Quantization (DCT/Q) 450 followed by Entropy Coder 460 to generate video bitstream. Since reconstructed pictures are also required in the encoder side to form reference pictures. Accordingly, Inverse Quantization and Inverse DCT (IQ/IDCT) 452 are also used to generate reconstructed prediction residuals. The reconstructed residuals are then added with the prediction selected by the switch 445 to form reconstructed video data using another adder 442. In-loop Filtering 470 is often used to reduce coding artifacts due to compression before the reconstructed video is stored in the Frame Buffer 480. For example, deblocking filter and Sample Adaptive Offset (SAO) have been used in HEVC. Adaptive Loop Filter (ALF) is another type of in-loop filter that may be used to reduce artifacts in coded images.

FIG. 4B illustrates an example of decoder system block diagram corresponding to the encoder in FIG. 4A. In FIG. 4A, the encoder side also includes a decoder loop to reconstruct the reference video at the encoder side. Most decoder components are used in the encoder side already except for the Entropy Decoder 461. Furthermore, only motion compensation is required for Inter prediction decoder 421 since the motion vectors can be derived from the video bitstream and there is no need for searching for the best motion vectors.

As shown in FIG. 4A and FIG. 4B, a coding system often applies filtering to the reconstructed image in order to enhance visual quality by reducing the coding artifacts. In other video processing systems, filtering may also be applied to the underlying frames to reduce noise or to enhance image quality. However, the assembled frames converted from 3D source video may contain some special features that may cause artifacts or reduce coding efficiency during conventional filtering. According, the present invention addresses filtering issues associated with assembled cubic frames.

BRIEF SUMMARY OF THE INVENTION

Methods and apparatus of processing cube face images are disclosed. According to embodiments of the present invention, one or more discontinuous boundaries within each assembled cubic frame are determined and used for selective filtering, where the filtering process is skipped at said one or more discontinuous boundaries within each assembled cubic frame when the filtering process is enabled. Furthermore, the filtering process is applied to one or more continuous areas in each assembled cubic frame.

When the selected cubic face format corresponds to one assembled cubic frame with blank areas, each discontinuous boundary is located between one cubic face and one blank area. When the selected cubic face format corresponds to one assembled cubic frame without blank area, each discontinuous boundary is located between two neighboring cubic faces not sharing a common cubic edge. The assembled cubic frame without blank area may correspond to a 1×6 assembled cubic frame, a 2×3 assembled cubic frame, a 3×2 assembled cubic frame or a 6×1 assembled cubic frame.

The filtering process may correspond to in-loop filtering in video encoding or video decoding. For example, the filtering process may comprise de-blocking, sample adaptive offset (SAO), adaptive loop filter (ALF), or a combination thereof. Whether the filtering process is applied to one or more continuous areas in each assembled cubic frame, whether the filtering process is skipped at said one or more discontinuous boundaries within each assembled cubic frame or both can be indicated by signaling syntax of on/off control in a video bitstream at an encoder side or determined by parsing the syntax of on/off control in the video bitstream at a decoder side. The syntax of on/off control can be incorporated in a sequence, video, cubic face, VPS (video parameter set), SPS (sequence parameter set), or APS (application parameter set) level of the video bitstream.

Whether the filtering process is applied to one or more continuous areas in each assembled cubic frame, whether the filtering process is skipped at said one or more discontinuous boundaries within each assembled cubic frame or both may also be indicated by signaling the selected cubic face format in a video bitstream at an encoder side or determined by parsing the selected cubic face format in the video bitstream at a decoder side. In one embodiment, the filtering process is skipped for all discontinuous boundaries between cubic faces and blank areas in assembled cubic frames with blank areas and for all discontinuous boundaries between neighboring cubic faces not sharing a common cubic edge in assembled cubic frames without blank areas. Whether the filtering process is applied to one or more continuous cubic face boundaries in each assembled cubic frame can be further indicated by signaling syntax of on/off control in a video bitstream at an encoder side or determined by parsing the syntax of on/off control in the video bitstream at a decoder side. In one embodiment, the syntax of on/off control is signaled at the encoder side or is parsed at the decoder side to control the filtering process for all continuous or discontinuous cubic face boundaries. In another embodiment, the syntax of on/off control is signaled at the encoder side for each cubic face boundary or parsed at the decoder side to control the filtering process for each cubic face boundary.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

As mentioned before, the six cubic faces representing 360-degree panoramic picture are continuous at the boundary of two connecting faces. In order to code or process the cubic faces efficiently using a conventional video coding or processing system, the cubic faces are assembled into cubic frames. However, for a giving assembled cubic frame, there are always discontinuities between some cubic faces or between a cubic face and a blank area. Even for a well-designed cubic assembling system, such discontinuities still exist. When video coding or processing incorporating a filtering process is applied to such assembled cubic frames, artifacts due to filtering may become noticeable or the filtering may reduce coding efficiency. In order to overcome such issues, the present invention discloses selective filtering techniques that apply filtering adaptively to cubic frames depending on discontinuity or continuity within the cubic frames, in particular at the cubic face boundaries.

Figure 5:
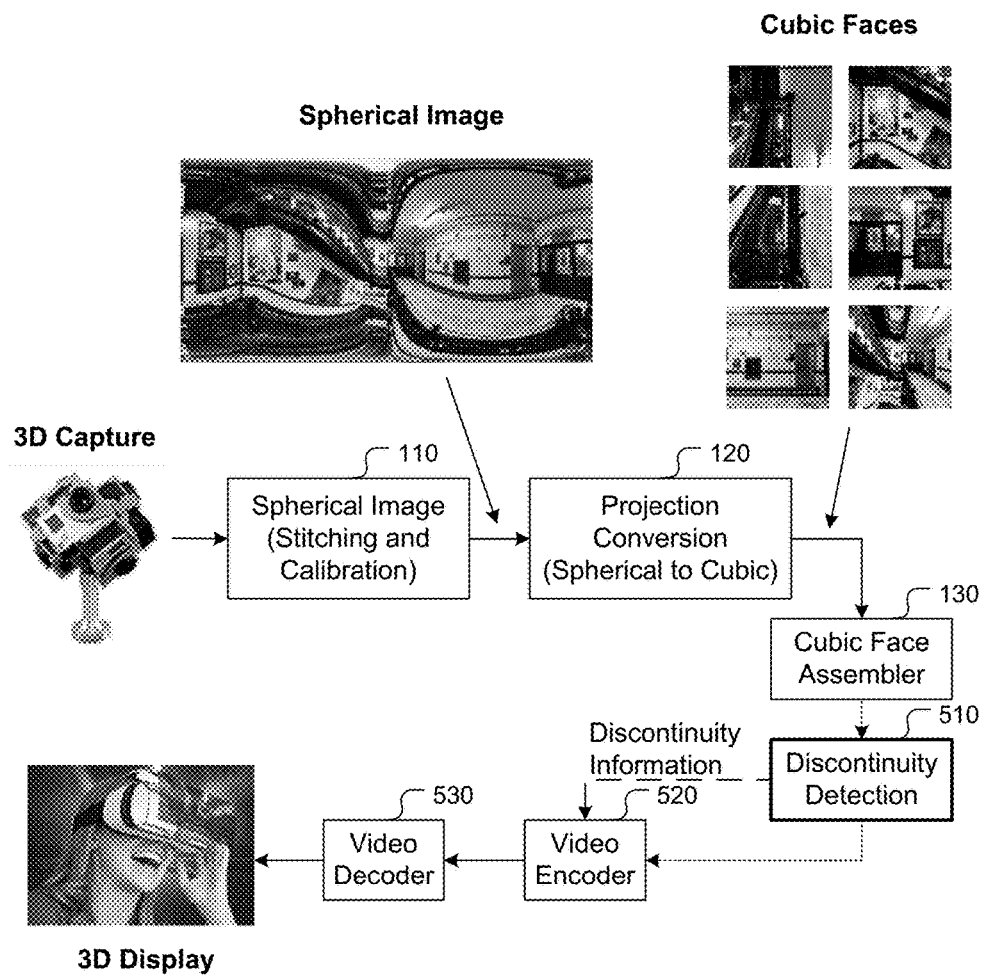
FIG. 5 illustrates an exemplary coding system incorporating an embodiment of the present invention, where the discontinuities are detected and used for selective filtering control.

FIG. 5 illustrates an exemplary coding system incorporating an embodiment of the present invention. The system converts source video from a 3D capture device into spherical images using spherical image processing unit 110. The spherical images are then projected onto faces of a cube using projection conversion unit 120. Furthermore, the cubic faces are assembled into cubic frames using cubic face assembler 130. The cubic face assembling may involve cubic face permutation and/or rotation. Furthermore, there are various assembled cubic frame (also named cubic layout) formats available. The system will select one target cubic frame format for further processing. After cubic frames are derived, embodiments according to the present invention detect discontinuity in the cubic frame using discontinuity detection unit 510. The discontinuity information is then provided to a discontinuity-aware video encoder 520 to encode the cubic frames. A discontinuity-aware video decoder 530 is used to decode the compressed cubic frames for display using a 3D display device.

When the cubic-face layout is provided, the discontinuous edges can be determined. The discontinuity may be located at the boundaries between adjacent cubic faces for cubic frame without blank areas, where the two adjacent cubic faces do not share a common cubic edge. The discontinuity may be located at the boundaries between cubic faces and blank areas for cubic frames with blank areas. In this disclosure, the cubic layout, cubic-face layout, cubic frame and cubic-face frame are used interchangeably. The discontinuity in face boundaries should not be filtered since filtering across the face boundary may cause artifacts or reduce coding efficiency. Therefore, embodiments according to present invention apply filtering to cubic frames adaptively. In particular, the filtering is not performed at discontinuous face boundaries. For example, in a coding system that utilizes in-loop filter (e.g. de-blocking, SAO, ALF or any combination), the in-loop filtering process is skipped at discontinuous face boundaries. In other words, the filtering process is only applied to continuous contents in the cubic frames.

While in-loop filtering for video coding is an example of applying the selective filtering process, the present invention may also be used in other video processing that includes the filtering process. For example, as is known in the field, image filtering is often used for noise reduction or image enhancement. The selective filtering depending on discontinuity or continuity is also applicable in this case. While discontinuity detection is referred as a criterion for whether to apply filtering, the present invention can be performed equivalently by checking where underlying pixels or areas are continuous. If the underlying pixels or areas are continuous, the filtering process can be applied. Otherwise, the filtering process is skipped.

For a discontinuity-aware video encoder, information regarding discontinuity in the cubic frame needs to be known to the decoder so that the decoder can apply corresponding selective filter at the decoder side. For example, the discontinuous edges and/or the continuous cubic faces can be signaled in the bit-stream syntax. As mentioned earlier, the face boundary may exist between cubic faces or between a cubic face and blank (black) area. Two possible syntax designs to signal the discontinuous edges and/or the continuous cubic faces are disclosed.

According to Scheme #1, the discontinuous edges and/or the continuous cubic faces are signaled. The syntax of the on/off control of the filtering process (e.g. de-blocking, SAO, ALF or any combination) can be signaled in the video bitstream at the sequence, video, cubic face, VPS (video parameter set), SPS (sequence parameter set), or APS (application parameter set) level.

According to Scheme #2, the information of the cubic-face layout format is signaled. The discontinuous edges and/or the continuous cubic faces can be determined according to the known cubic-face layout format. According to the cubic-face layout format, the filtering process (e.g. de-blocking, SAO, ALF or any combination) at the boundary of discontinuity faces and/or boundary between a cubic face and blank (black) area will be disabled. On the other hand, the on/off control of the filtering process (e.g. de-blocking, SAO, ALF or any combination) at the boundary of continuous faces can be further signaled.

In one embodiment, a syntax element can be transmitted to specify the on/off states of all the boundaries of the continuous faces. Alternatively, for each boundary of the continuous face, a syntax element is transmitted to specify the on/off control for the filtering process (e.g. de-blocking, SAO, ALF or any combination).

Figure 1:
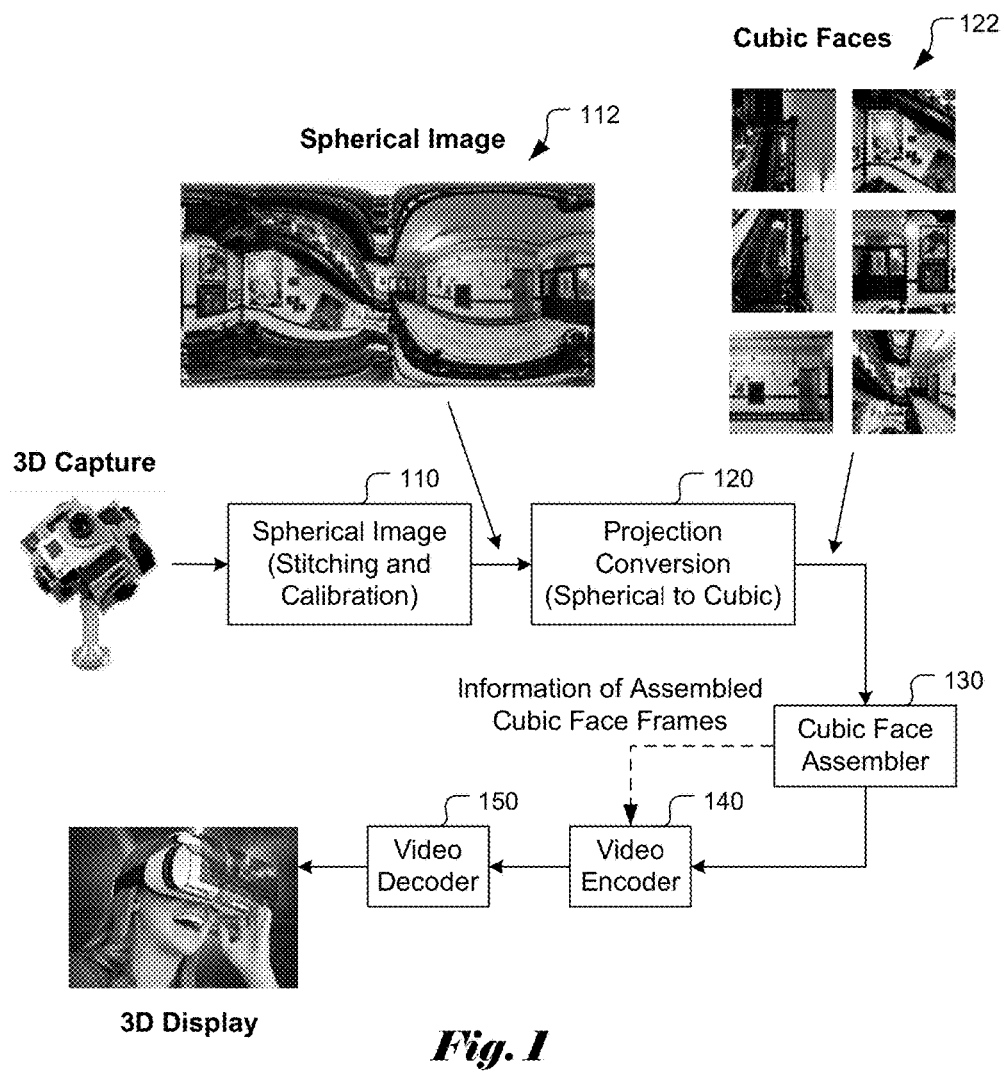
FIG. 1 illustrates an exemplary processing chain for 360-degree spherical panoramic pictures.
Figure 2:
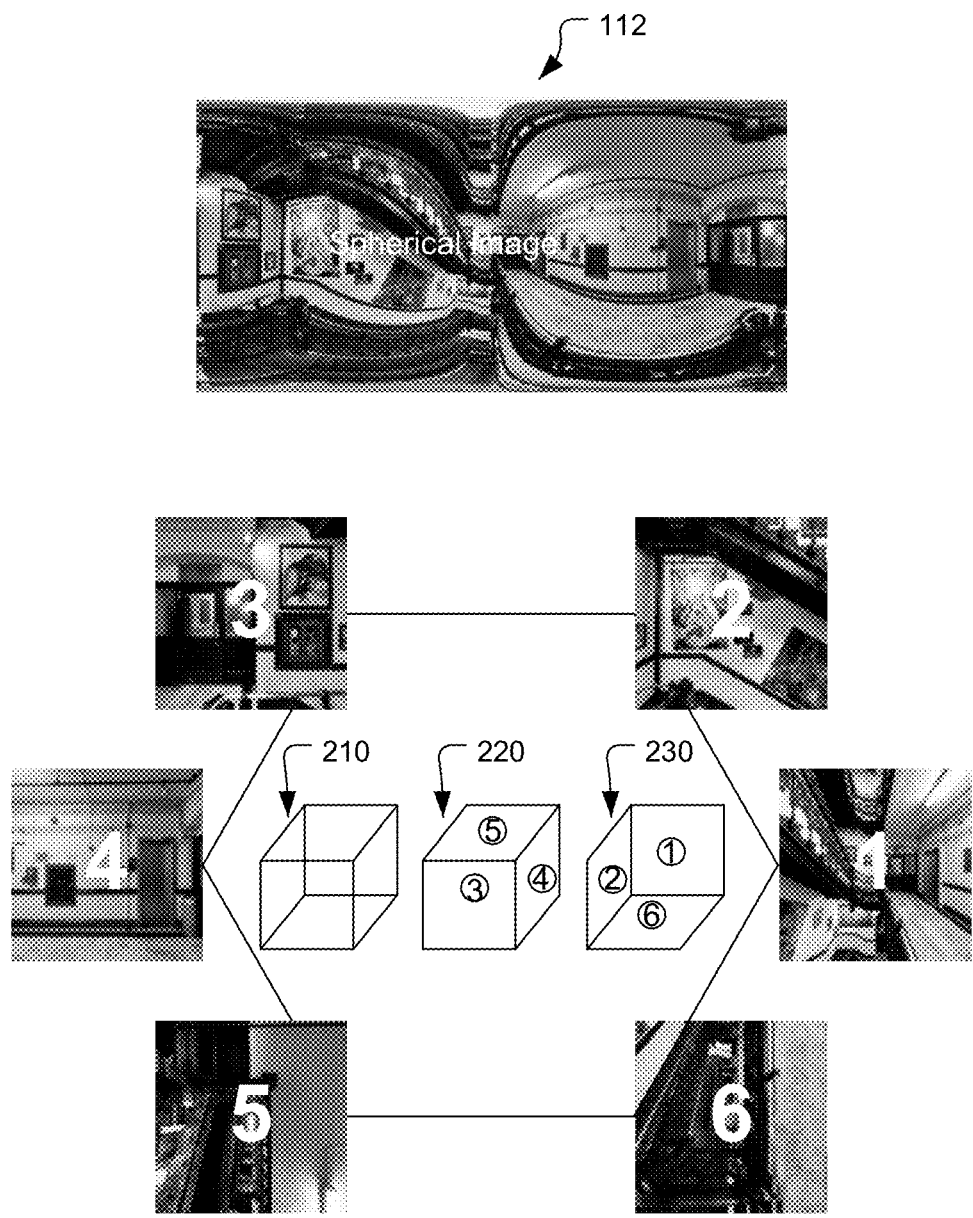
FIG. 2 illustrates an example of the project conversion process to project a spherical panoramic picture into six cubic faces on a cube.
Figure 3A:
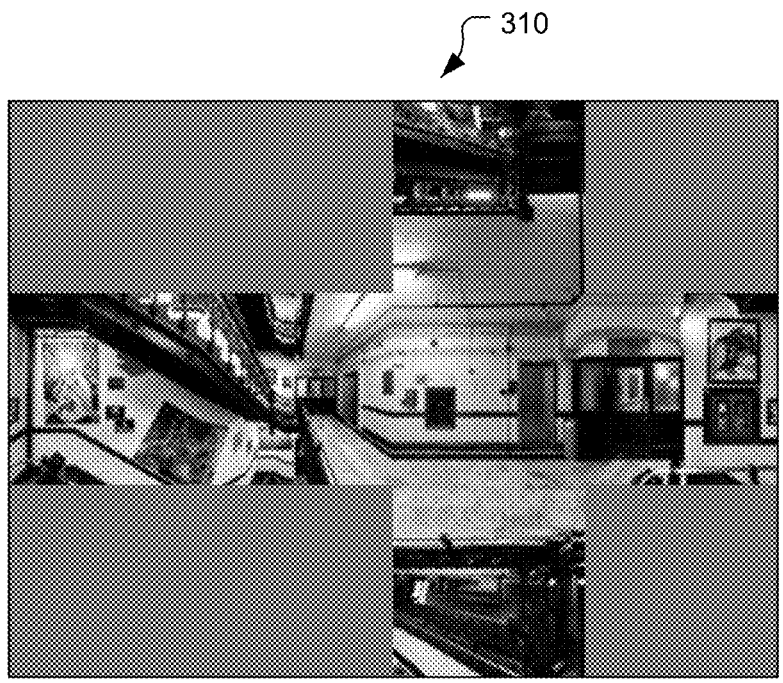
FIG. 3A illustrates two examples cubic-face assembled frames with blank areas, where two sets of fully interconnected cubic faces correspond to two different way of unfolding the six faces from the cube.
Figure 3A:
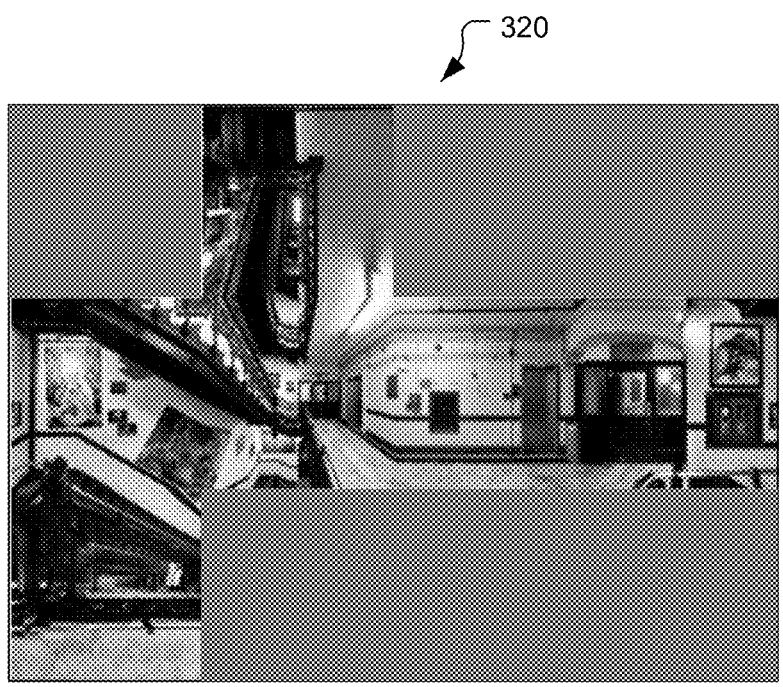
Figure 6A:
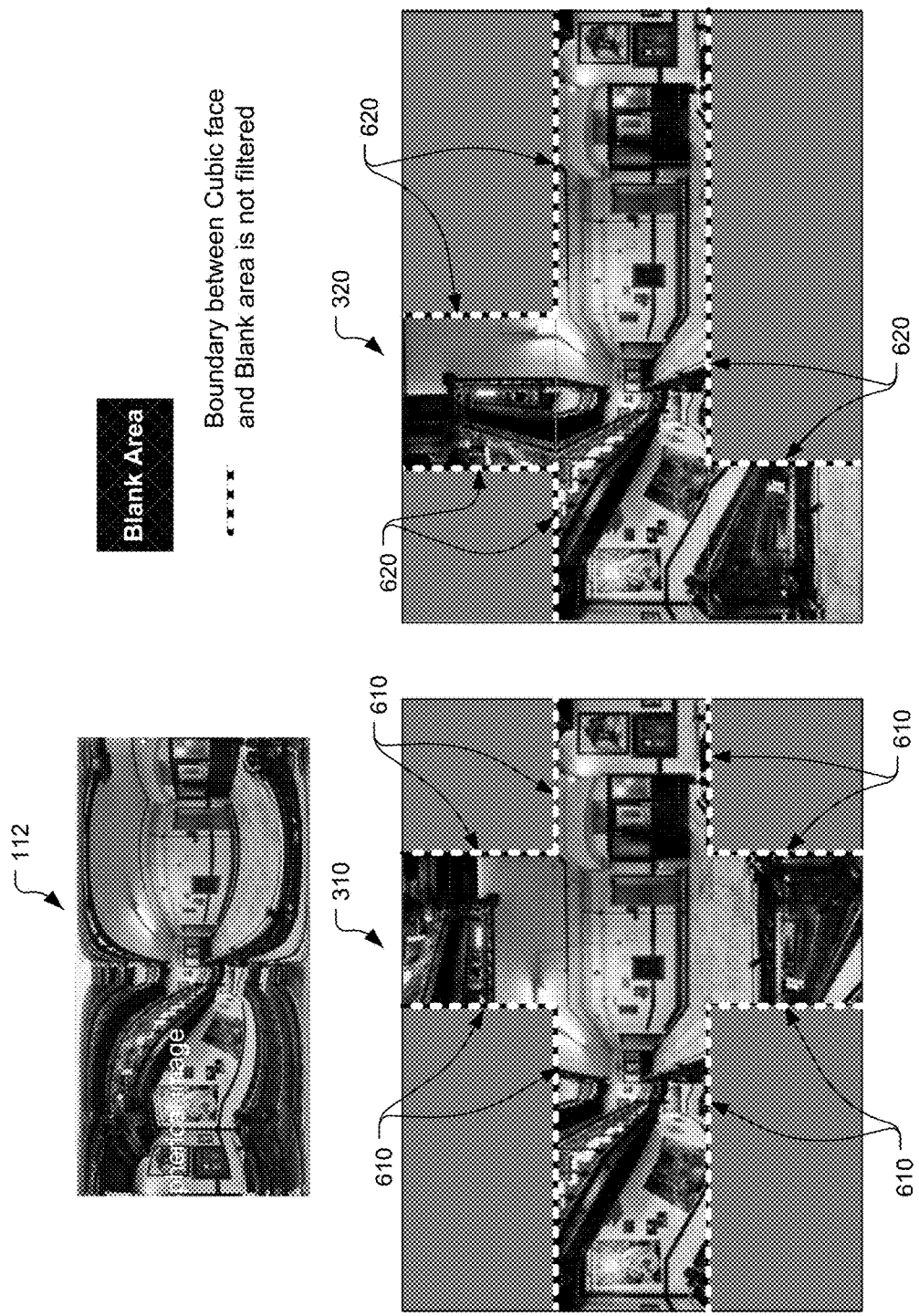
FIG. 6A illustrates examples of discontinuities between the cubic faces and blank areas in two cubic layouts with blank areas.

When the cubic frame format is known, the discontinuities in the cubic frame can be determined. For example, if cubic frames with blank areas are used, the discontinuities in the two cubic layouts 310 and 320 of FIG. 3A are shown in FIG. 6A. The discontinuities correspond to boundaries 610 and 620 between the cubic faces and the blank areas. Since the blank areas are filled with dummy data such as a black level, filtering across these boundaries may cause artifacts or reduce coding efficiency. Therefore, the filtering process will not be applied to these boundaries according to embodiments of the present invention.

Figure 3B:
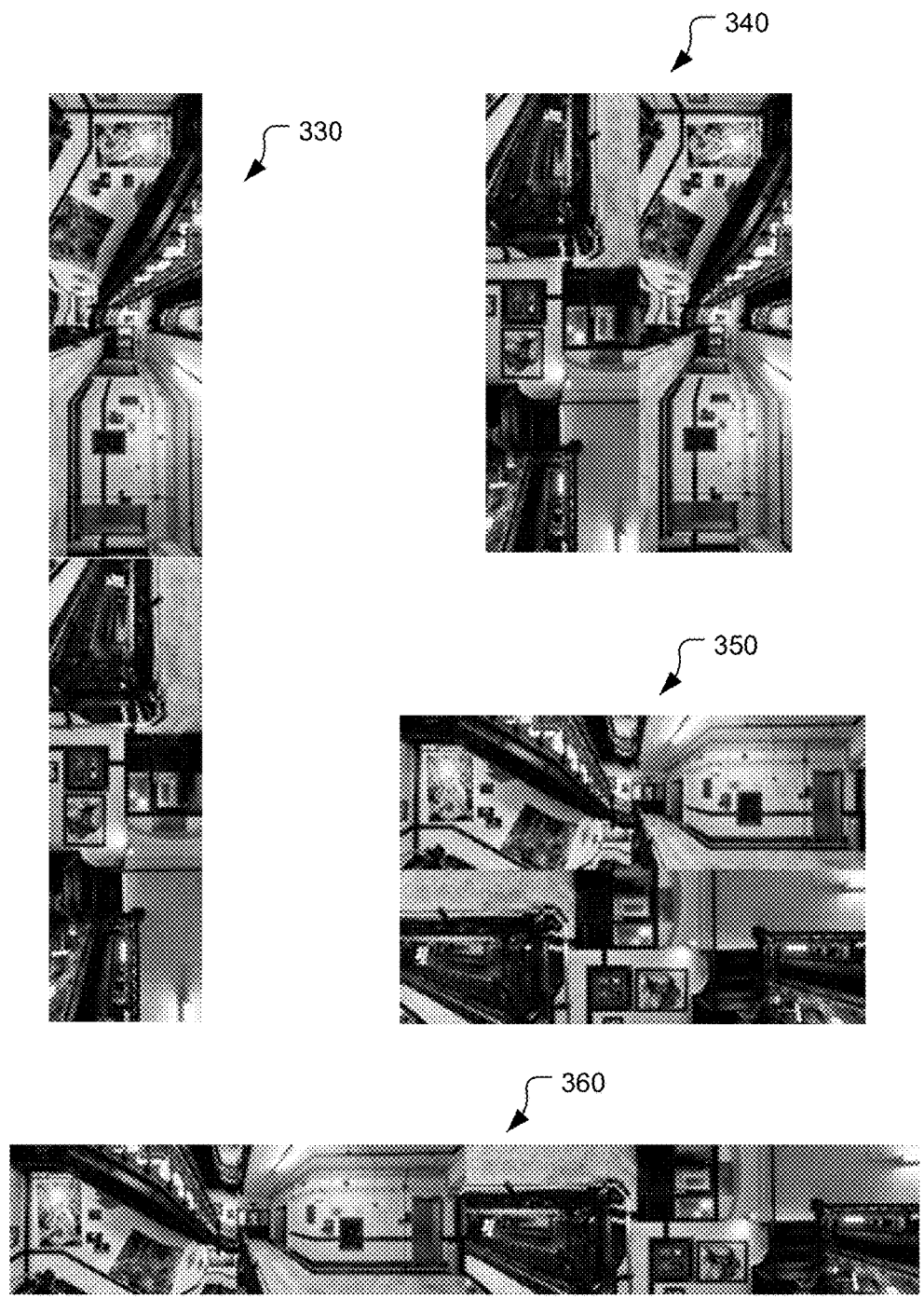
FIG. 3B illustrates examples of another type of cubic-face assembling, where the six faces are assembled into a rectangular frame without blank area.
Figure 4A:
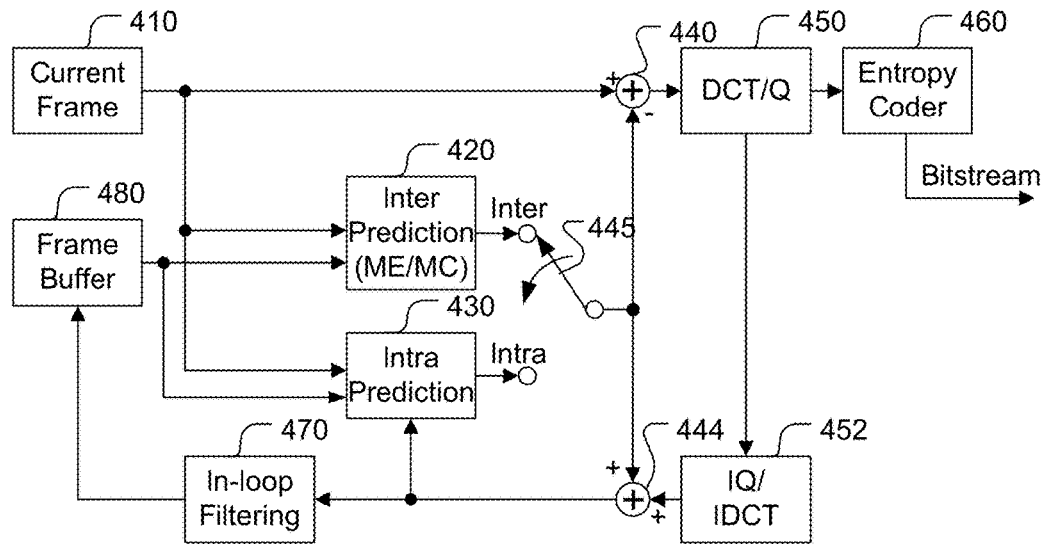
FIG. 4A illustrates an exemplary block diagram of a video encoder system, such as HEVC (High Efficiency Video Coding), incorporating adaptive Inter/Intra prediction.
Figure 4B:
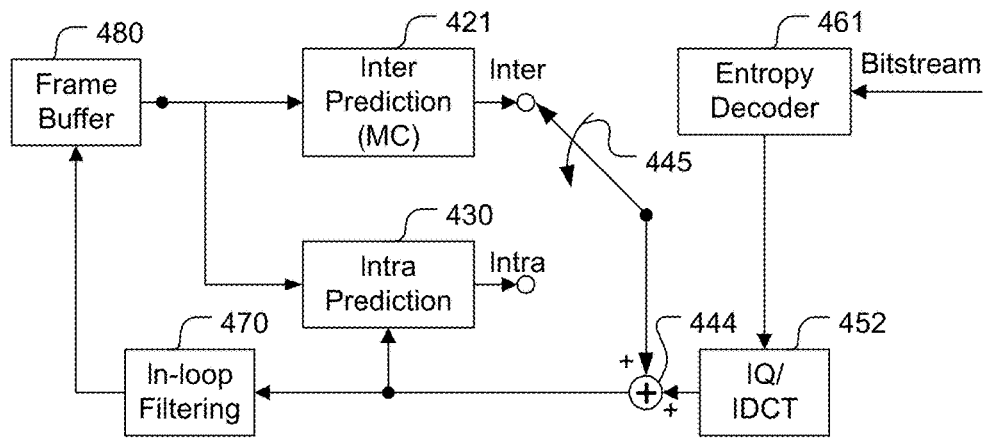
FIG. 4B illustrates an exemplary block diagram of a video decoder system for the video encoder in FIG. 4A.
Figure 6B:
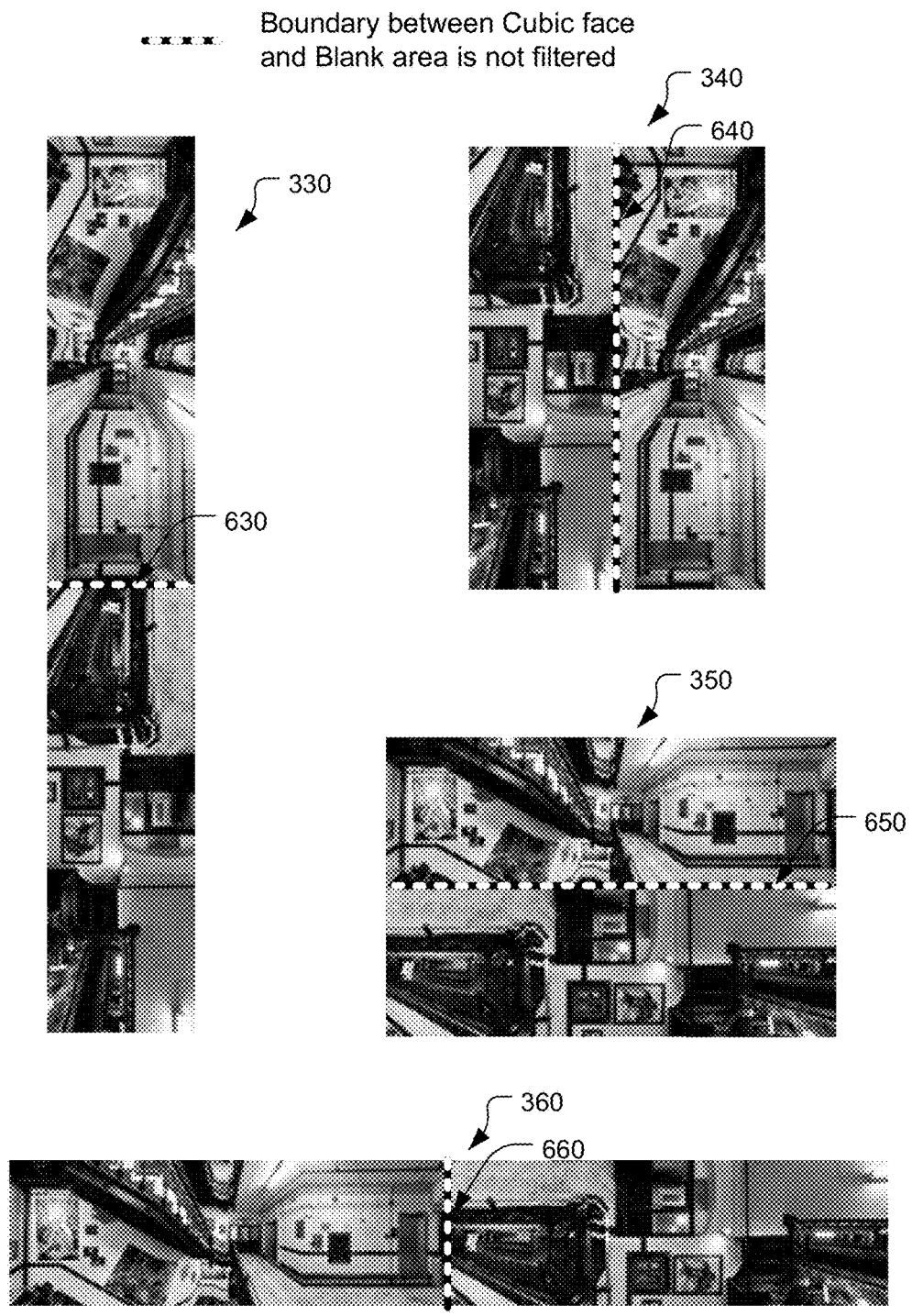
FIG. 6B illustrates examples of discontinuities between the cubic faces in cubic layouts without blank area.

In another example, if cubic frames without blank areas are used, the discontinuities in the four cubic layouts 330, 340, 350 and 360 of FIG. 3B are shown in FIG. 6B. The discontinuities correspond to boundaries 630 to 660 between two cubic faces or two sets of cubic faces. Filtering across these boundaries may cause artifacts or reduce coding efficiency. Therefore, the filtering process will not be applied to these boundaries according to embodiments of the present invention.

Figure 7:
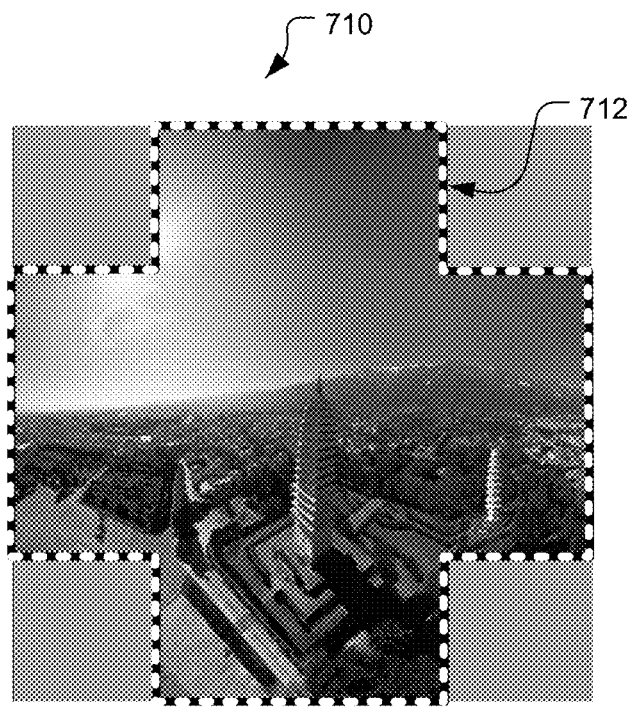
FIG. 7 illustrates examples of discontinuities for another type of cubic frame (named Hemi-cube frame), where discontinuities for an assembled with blank areas and an assembled frame without blank area are indicated.
Figure 7:
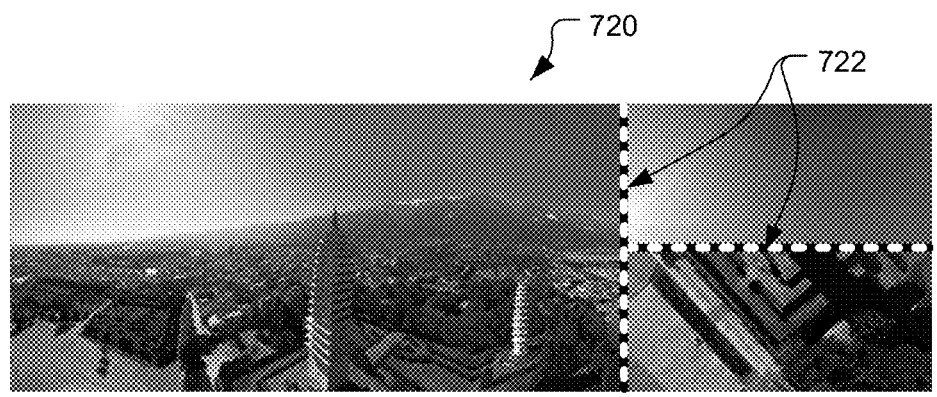

The assembled cubic frames in FIG. 3A and FIG. 3B are intended to illustrate some examples of cubic frames. By no means, they represent an exhaustive list of all possible cubic frame formats. For example, another type of cubic frame (named Hemi-cube frame) is shown in FIG. 7, where frame 710 corresponds to an assembled frame with blank areas and frame 720 corresponds to an assembled frame without blank area. The discontinuities of frame 710 are indicated by dashed lines 712 and the discontinuities of frame 720 are indicated by dashed lines 722. Again, according to the present invention, the filtering process is not applied at the discontinuities.

The inventions disclosed above can be incorporated into various video encoding or decoding systems in various forms. For example, the inventions can be implemented using hardware-based approaches, such as dedicated integrated circuits (IC), field programmable logic array (FPGA), digital signal processor (DSP), central processing unit (CPU), etc. The inventions can also be implemented using software codes or firmware codes executable on a computer, laptop or mobile device such as smart phones. Furthermore, the software codes or firmware codes can be executable on a mixed-type platform such as a CPU with dedicated processors (e.g. video coding engine or co-processor).

Figure 8:
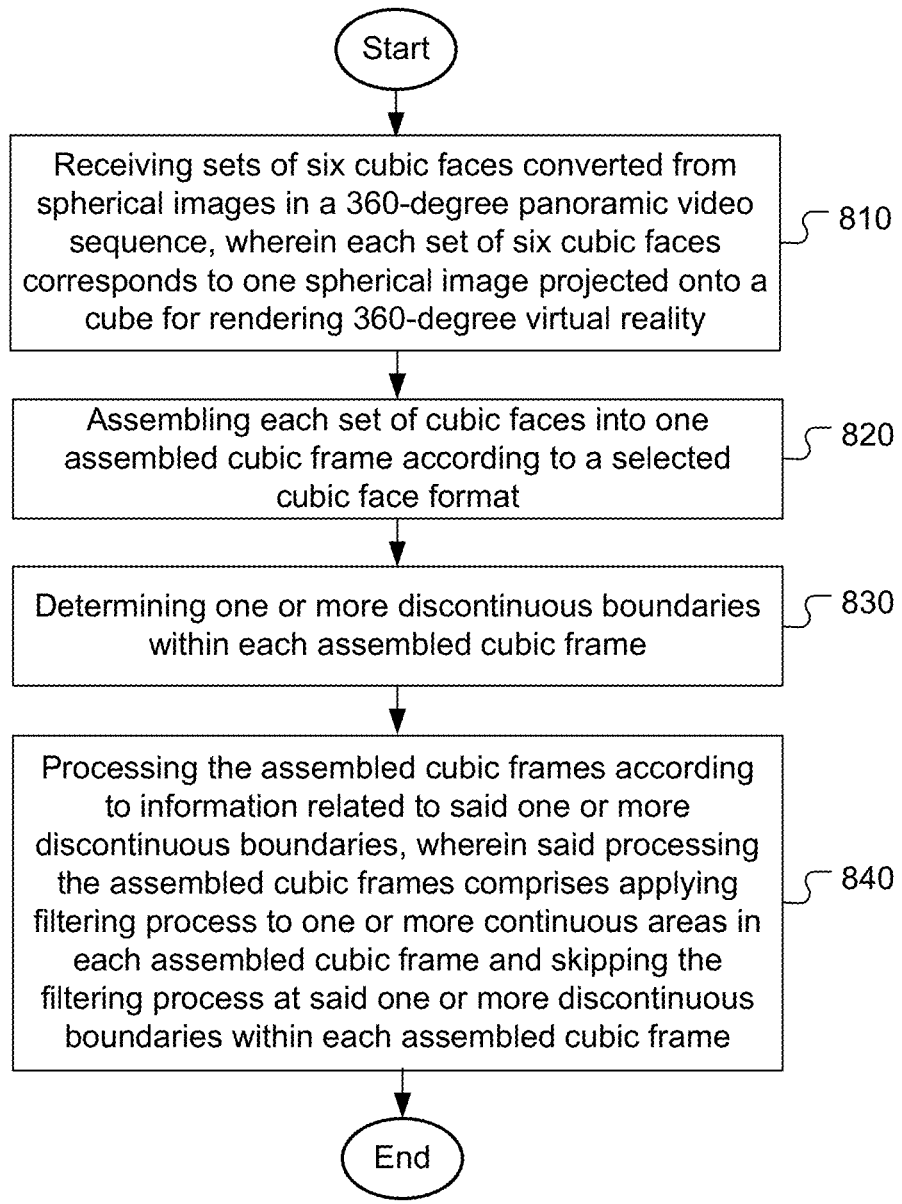
FIG. 8 illustrates an exemplary flowchart for a video processing system incorporating an embodiment of the present invention, where filtering is applied selectively according to detected discontinuities in the cubic frame.

FIG. 8 illustrates an exemplary flowchart for a video processing system incorporating an embodiment of the present invention, where filtering is applied selectively according to detected discontinuities in the cubic frame. According to this method, sets of six cubic faces converted from spherical images in a 360-degree panoramic video sequence are received in step 810, where each set of six cubic faces corresponds to one spherical image projected onto a cube for rendering 360-degree virtual reality. Each set of cubic faces is assembled into one assembled cubic frame according to a selected cubic face format in step 820. Various examples of assembled frames are shown in FIG. 3A and FIG. 3B. One or more discontinuous boundaries within each assembled cubic frame are determined in step 830. Various examples of detected discontinuities in assembled frames are shown in FIG. 6A, FIG. 6B, and FIG. 7. The assembled cubic frames are processed according to information related to said one or more discontinuous boundaries in step 840, wherein said processing the assembled cubic frames comprising skipping filtering process at said one or more discontinuous boundaries within each assembled cubic frame when the filtering process is enabled. As mentioned before, the filtering process may comprise de-blocking, SAO, ALF or any combination.

The above flowcharts may correspond to software program codes to be executed on a computer, a mobile device, a digital signal processor or a programmable device for the disclosed invention. The program codes may be written in various programming languages such as C++. The flowchart may also correspond to hardware based implementation, where one or more electronic circuits (e.g. ASIC (application specific integrated circuits) and FPGA (field programmable gate array)) or processors (e.g. DSP (digital signal processor)).

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of processing cube face images, the method comprising:
    receiving sets of six cubic faces converted from spherical images in a 360-degree panoramic video sequence, wherein each set of six cubic faces corresponds to one spherical image projected onto a cube for rendering 360-degree virtual reality;
    assembling each set of cubic faces into one assembled cubic frame according to a selected cubic face format;
    determining one or more discontinuous boundaries within each assembled cubic frame; and
    processing the assembled cubic frames according to information related to said one or more discontinuous boundaries, wherein said processing the assembled cubic frames comprises:
    skipping filtering process at said one or more discontinuous boundaries within each assembled cubic frame when the filtering process is enabled.

2. The method of claim 1, wherein each discontinuous boundary is located between one cubic face and one blank area.

3. The method of claim 1, wherein each discontinuous boundary is located between two neighboring cubic faces not sharing a common cubic edge.

4. The method of claim 1, wherein the filtering process corresponds to in-loop filtering in video encoding or video decoding.

5. The method of claim 4, wherein the filtering process comprises de-blocking, sample adaptive offset (SAO), adaptive loop filter (ALF), or a combination thereof.

6. The method of claim 1, wherein the syntax of on/off control is in a sequence, video, cubic face, VPS (video parameter set), SPS (sequence parameter set), or APS (application parameter set) level of the video bitstream.

7. The method of claim 1, wherein the filtering process is skipped for all discontinuous boundaries between cubic faces and blank areas in assembled cubic frames with blank areas and for all discontinuous boundaries between neighboring cubic faces not sharing a common cubic edge in assembled cubic frames without blank areas.

8. The method of claim 1, wherein whether the filtering process is applied to one or more continuous cubic face boundaries in each assembled cubic frame is further indicated by signaling syntax of on/off control in a video bitstream at an encoder side or determined by parsing the syntax of on/off control in the video bitstream at a decoder side.

9. The method of claim 8, wherein the syntax of on/off control is signaled at the encoder side or is parsed at the decoder side to control the filtering process for all continuous cubic face boundaries.

10. The method of claim 8, wherein the syntax of on/off control is signaled at the encoder side for each cubic face boundary or parsed at the decoder side to control the filtering process for each cubic face boundary.

11. An apparatus for processing cube faces, the apparatus comprising one or more electronic circuits or processor arranged to:
receive sets of six cubic faces converted from spherical images in a 360-degree panoramic video sequence, wherein each set of six cubic faces corresponds to one spherical image projected onto a cube for rendering 360-degree virtual reality;
assemble each set of cubic faces into one assembled cubic frame according to a selected cubic face format;
determine one or more discontinuous boundaries within each assembled cubic frame; and
process the assembled cubic frames according to information related to said one or more discontinuous boundaries, wherein said processing the assembled cubic frames comprises:
apply filtering process to one or more continuous areas in each assembled cubic frame and skipping the filtering process at said one or more discontinuous boundaries within each assembled cubic frame.

\* \* \* \* \*